United States Patent [19]

Iwasaki

[11] 4,338,823
[45] Jul. 13, 1982

[54] VIBRATION SENSOR

[75] Inventor: Shinichiro Iwasaki, Auburn Heights, Mich.

[73] Assignee: Aisin Seiki Company, Ltd., Kariya, Japan

[21] Appl. No.: 182,701

[22] Filed: Aug. 29, 1980

[51] Int. Cl.$^3$ ............................................. G01H 11/00
[52] U.S. Cl. ...................................... 73/654; 324/208
[58] Field of Search ............... 73/654, 652, 35, 517 R, 73/517 B, 862.64; 324/207, 208

[56] References Cited

U.S. PATENT DOCUMENTS 3,281,743 10/1966 Anderson .......................... 73/654 X
3,877,314 4/1975 Bernin ............................... 73/517 B

FOREIGN PATENT DOCUMENTS 909023 10/1962 United Kingdom ................. 324/207

Primary Examiner—James J. Gill
Attorney, Agent, or Firm—Oblon, Fisher, Spivak, McClelland & Maier

[57] ABSTRACT

A vibration sensor arrangement comprised of a mechanical-electrical transducer for converting mechanical changes such as displacement caused by vibrations to corresponding electrical signals such as phase-shifted pulse signals and including a body mounted on a structural block such as an engine block which is susceptible to vibrations. The body accommodates a ferromagnetic material member which is disposed on a resilient member such as a flat spring and which is capable of relative displacement in response to the vibratory movement of the block or body. At least one magnetically soft material member and a permanent magnet are both disposed adjacent to the range of the relative displacement of the ferromagnetic material member. The magnetically soft material member has an electrical coil located thereon. In the arrangement, when a pulse voltage is applied to one end of the electrical coil, a voltage drop across a resistor coupled with the other end of the coil is detected. The voltage drop across the resistor has a timing delayed with respect to the timing of the applied pulse voltage, which corresponds to any relative displacement of the ferromagnetic material member caused by the vibrations to which the block and body are susceptible. The delay of the voltage drop is then provided in the form of an analog voltage.

5 Claims, 8 Drawing Figures

VIBRATION SENSOR

BACKGROUND OF THE INVENTION

1. Field of the Invention

The present invention relates to a vibration sensor, and more particularly to a vibration sensor arrangement which is responsive to a structural block susceptible to vibrations and which converts changes in the position of the block, caused by vibration, to corresponding electrical signals.

2. Description of the Prior Art

One prior art vibration sensor of the type disclosed herein includes a semiconductor strain gauge which has its electrical resistance varying with the magnitude of vibrations and which converts the resistance changes to corresponding analog voltage outputs in the form of vibration detection signals. In the prior art vibration sensor, the changes in the electrical resistance provided by the sensor, in response to the vibrations, are extremely small and a very complicated electrical circuit arrangement must be provided for preventing noise signal occurrences. Another disadvantage of the conventional sensor is that the semiconductor element is very susceptible to temperature drifts and therefore its operating temperature range must be limited to about $-30°$ C. to about $+100°$ C.

SUMMARY OF THE INVENTION

In light of the foregoing disadvantages and problems of the prior art vibration sensor, it is therefore an object of the present invention to provide an improved vibration sensor which provides easy electrical processing of detected vibration signals.

Another object of the present invention is to provide an improved vibration sensor which is not susceptible to temperature changes, and has improved mechanical strength, and durability.

Still another object of the present invention is to provide an improved vibration sensor which incorporates a large scale integration (LSI) technology of the type utilized in a microcomputer which contains relatively simple programmed logic to enable detected vibration data to be read and processed.

In accordance with the present invention summarized briefly above, a transducer or mechanical-electrical converter is provided for converting mechanical movements such as vibrations to corresponding electrical signals such as phase-shifted pulse signals. The converter has a body mounted on a block that is susceptible to vibratory movement. The body accommodates a ferromagnetic material member capable of relative displacement in response to the vibratory movement of the block. The body further accommodates at least one magnetically soft member and a permanent magnet both firmly disposed adjacent to the range of the relative displacement of the ferromagnetic member. The magnetically soft member has an electrical coil winding located thereon. Furthermore, the magnetically soft member is designed to have a small transverse cross-section which enables it to reach its magnetic saturation very readily. Consequently, the ferromagnetic member which is capable of relative vibratory displacement and thus controls the amount of the magnetic flux provided by an external magnetic field to act on the magnetically soft member, may also be designed to have a smaller transverse cross-section. The electrical coil winding has a greater number of turns which is sufficient to cause the magnetically soft member to be magnetically saturated when a relatively low voltage is applied to the coil, and therefore a low level energizing current flows into it. The permanent magnet is designed to be of such a reduced dimension that it can allow a magnetic field, of the strength depending on the amount of the vibratory displacement of the ferromagnetic member, to be applied to the magnetically soft member within the predetermined relative vibratory displacement of the ferromagnetic member.

A time interval T from the instant at which a voltage begins to be applied to the coil on the magnetically soft member, which is appropriately spaced apart from the permanent magnet firmly mounted in the body, to the instant at which the magnetically soft member is completely saturated can be expressed approximately as follows:

$$T = \frac{N}{E} \cdot (\Phi m - \Phi x) \quad (1)$$

wherein:

E: applied voltage across coil
N: turns of coil
$\phi m$: maximum flux (=saturated flux)
$\phi x$: flux provided by external magnetic field to act on the magnetically soft member via the ferromagnetic member.

As readily noted from the above expression, any relative motion of the ferromagnetic member caused by the vibration causes $\Phi_x$ to have corresponding changes, thus changing T. In more detail, relative motion of the ferromagnetic member is caused according to a vibration, causing the corresponding change in the external flux $\Phi_x$ to occur to be applied to the magnetically soft member which is appropriately spaced away from the permanent magnet and thus causing the corresponding change in the time interval T from the instant at which a voltage is to be applied to the coil to the instant at which a coil energizing current reaches a certain level.

Based on the above observation, the vibration sensor, according to the present invention, includes an electrical circuit which detects such time interval T and provides an electrical signal output which represents a voltage level corresponding to the detected time interval T. In one preferred embodiment of the present invention, an amorphous magnetic material is preferably employed to form a magnetically soft member. Usually, since the amorphous magnetic material member must be manufactured by quenching from a liquid-phase metal, it is formed in a thin sheet. In terms of the magnetic properties, it is ferromagnetic and has high permeability and high magnetic saturation. Additionally, it provides a small coercive force and is mechanically strong and hard to break. Other features are resilience thereof and reproducibility. These features or properties of the amorphous magnetic material prove to meet the mechanical and electrical requirements of the vibration sensor according to the present invention. Therefore, using such material has the advantages of making it easy to electrically process signals and provide an improved accuracy in determining the value of the time interval T. It also permits a simple manufacturing process and makes the magnetically soft member more resistant against vibrations and shocks.

In another preferred embodiment of the present invention, the ferromagnetic material member is formed of amorphous magnetic material, soft iron material or like material. These materials present high permeability, and are therefore highly reliable in causing changes in the external magnetic flux to be applied to the magnetically soft member despite any relatively small displacement caused due to vibrations.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2b is a waveform diagram of input and output signals of the electrical processing circuit shown in FIG. 2a;

FIG. 3b is a graphical representation of data regarding time difference indicative voltages corresponding to the displaced positions due to vibrations which have been measured by causing changes in the relative position of the ferromagnetic member in the configuration shown in FIG. 3a;

FIG. 5b is a graphical representation similar to FIG. 5a, showing data obtained by measuring time difference indicative voltage in the configuration shown in FIG. 5a.

DETAILED DESCRIPTION OF THE PREFERRED EMBODIMENTS

Figure 1:
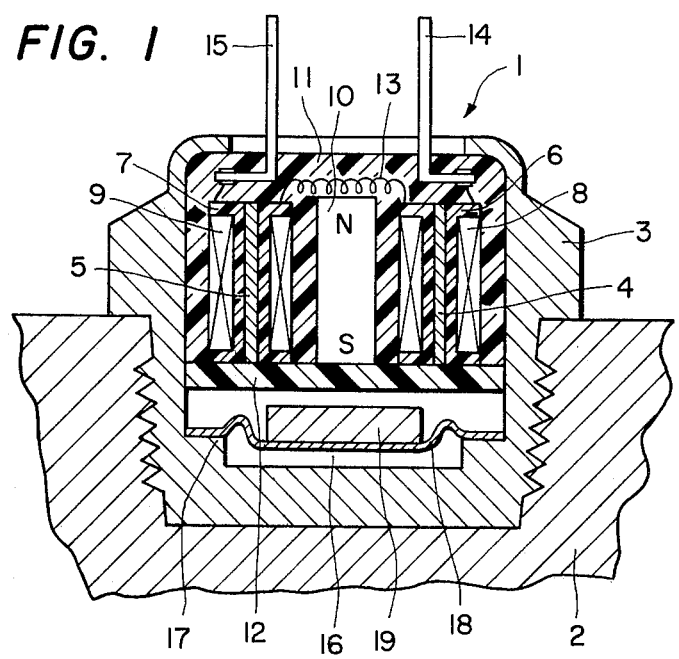
FIG. 1 is a longitudinal sectioned view of one preferred embodiment of the vibration sensor according to the present invention.

In a first preferred embodiment shown in FIG. 1, a sensor arrangement generally desginated by 1 includes a structural block 2 susceptible to vibration such as an engine block in an automotive vehicle, and a body 3 of nonmagnetic metallic material mounted on the block 2 and fixed thereon by means of a screw. A first stationary frame member 11 of synthetic resin material is firmly mounted within the body 3 and has respective recesses formed for accommodating a pair of magnetically soft members 4, 5, a pair of bobbins 6, 7 inserted into the respective magnetically soft members 4, 5, a pair of electrical coils 8, 9 wound around the respective bobbins 6, 7 and a permanent magnet 10. All of the above-mentioned members in the recesses are held firmly in place by means of a second member 12 of synthetic resin material which is also firmly mounted within the body 3. One end of one of the coils 8, 9 is connected with one end of the other coil as shown at 13, and the other ends of the coils 8, 9 are coupled with respective lead wires 14, 15 which extend outside the body 3. In a space 16 defined by the second member 12 within the body 3, a spring element such as a flat or leaf spring 18 as shown is disposed with its opposite ends secured to an inner peripheral shoulder 17 formed on the body 3, the flat spring 18 carrying a ferromagnetic material member 19 rigidly mounted thereon. As such, when an external vibratory force causes the block 2 to vibrate, followed by causing a vibration of the body 3 therewith, the ferromagnetic member 19 on the flat spring 18 is then held in its non-vibrating position by the inertia action of the flat spring 18, and the permanent magnet 10 and the magnetically soft members 4, 5 carrying the electrical windings 8, 9 firmly disposed within the body 3 and vibrating with the block 2 are eventually moved closer to or away from the ferromagnetic member 19 held in its non-vibrating position according to the vibrations to which the body 3 is susceptible. In other words, the ferromagnetic member 19 has a relative displacement according to such vibrations with regard to the permanent magnet 10 and the magnetically soft members 4, 5 carrying the electrical coils. Such relative displacement positions of the ferromagnetic member 19 caused by the vibrations are detected by the electrical processing circuit which will be described later and which provides vibration detection signals representing the vibrations to which the vibratory body 2 is subjected.

A magnetically soft material exhibiting high permeability ($\mu_{max} > 10^3$) and low coercive force ($< 1.0$ Oe) is used in this invention. (Some magnetically soft materials are described in Hasegawa et al., "Soft Magnetic Properties of Metallic Glasses—Recent Developments", J. Appl. Phys. 50(3), March, 1979 pp. 1551–1556. Magnetically soft materials are sold under the trademark MET-GLAS (TM) by Allied Chemical Corp.).

Figure 2A:
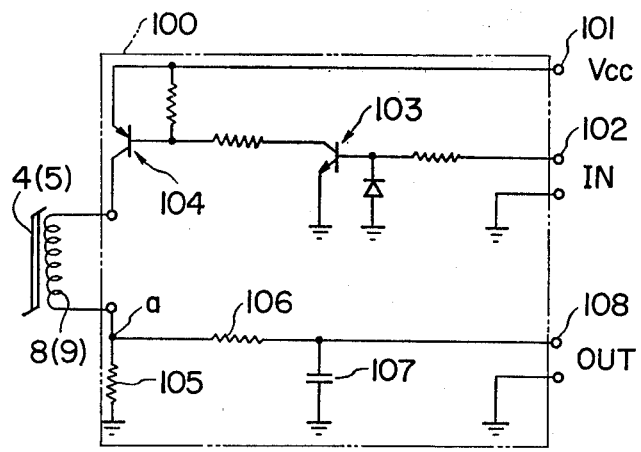
FIG. 2a is a circuit diagram illustrating the arrangement of an electrical processing circuit coupled with the vibration sensor shown in FIG. 1 and which provides an analog voltage output of a level corresponding to the detected displacement due to vibrations.

FIG. 2a is a schematic diagram illustrating the arrangement of the electrical processing circuit 100 in one embodied form. The circuit arrangement 100 includes a terminal 101 coupled with a constant power supply source (not shown) and to which a constant level d.c. voltage (+5 V, for example) from the source is applied. Applying a voltage pulse of 5 to 25 KHz to an input terminal 102 causes an NPN transistor 103 to conduct during the positive level of the voltage pulse. The NPN transistor 103 is turned off during the ground level of the pulse. A PNP transistor 104 is provided and remains on during the time period that NPN transistor 103 is on, and remains off during the time period that NPN transistor 103 is off.

As noted from the above, a constant supply voltage (Vcc) which is applied to the input terminal 102 during the positive level of the voltage pulses is applied to the coils 8, 9, and no supply voltage is applied during the ground level of the input voltage pulses. A voltage proportional to a current flow through the windings 8, 9 is developed across a resistor 105. The output therefrom is applied to an integrator circuit consisting of a resistor 106 and a capacitor 107. The integrator circuit provides an integrated voltage output which appears at an output terminal 108.

Figure 2B:
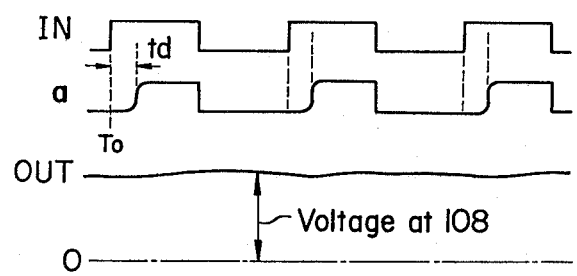

FIG. 2b shows the waveforms of the input and output voltages of the circuit shown in FIG. 2a. A time interval td from the instant at which the input voltage (IN)

rises at the beginning of the positive level to the instant at which the voltage across the resistor 104 rises to over a given level, and the integrated voltage $V_x$ from the voltage (a) across the resistor 105 correspond to the relative displacement position of the ferromagnetic member 19.

The vibration sensor arrangement 1 which has been described in connection with the first preferred embodiment thereof is coupled with the above described electrical processing circuit 100, which can provide electrical signals which correspond to the relative displacement positions of the ferromagnetic member 19 in the vibration sensor arrangement.

Figure 3B:
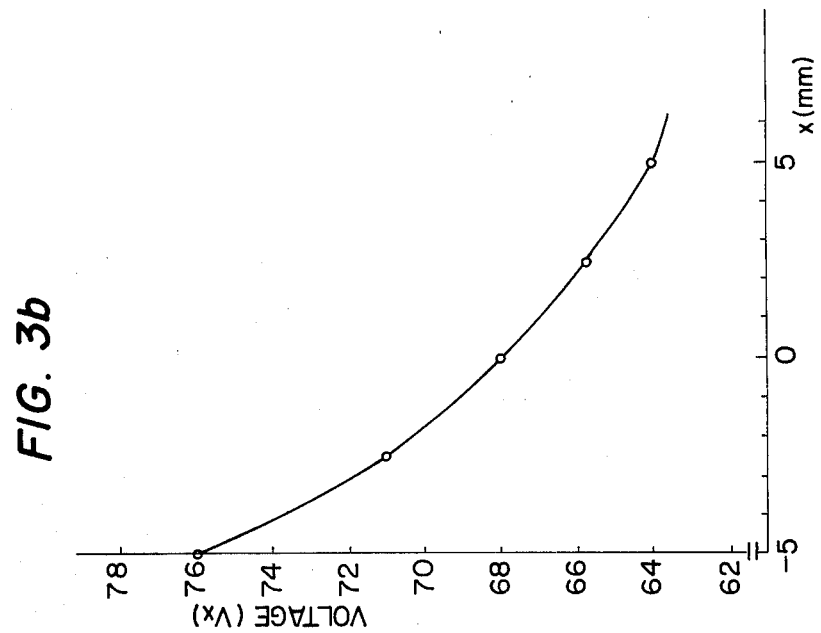
Figure 3A:
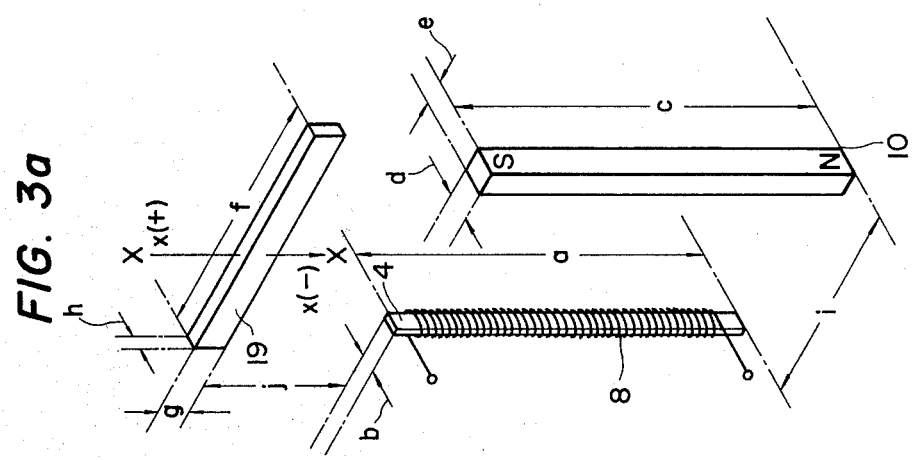
FIG. 3a is a perspective view illustrating the relative positions to be assumed by the magnetically soft member, permanent magnet and ferromagnetic member according to a timing delay between two pulses which have been experimentally determined and at which timing the ferromagnetic member is to assume a displaced position in relation to the magnetically soft member and permanent magnet as configured in FIG. 1.

The provision of such electrical signals is now described by referring to the experimental data presented in FIG. 3b. In order to experimentally determine a time difference-indicative voltage $V_x$ corresponding to any relative displacement position X of the ferromagnetic member 19 caused by any vibration in the longitudinal axial direction, or X-X direction, of the magnetically soft member 4 and permanent magnet 10, the sensor is configured as shown in FIG. 3a such that the ferromagnetic member 19 is disposed with its longitudinal axis traversing the longitudinal directions of the coil 8 wound magnetically soft member 4 and permanent magnet 10 in a perpendicular direction thereto, and it is assumed that when the mid-point of the longitudinal axis of the ferromagnetic member 19 is situated in the middle positions of the respective longitudinal axes of the magnetically soft member 4 and permanent magnet 10 and the distance j from the magnetically soft member 4 to the ferromagnetic member 19 is 5 mm, the ferromagnetic member 19 which changes its relative position is situated at the origin (x=0). Case No. 1 in the following table presents the relationships between the parameters such as shapes, configurations, dimensions a~j and types of materials used, and the experimentally obtained results.

high linearity and accuracy. It is to be noted that in the embodiment of FIG. 1, a pair of magnetically soft members are provided differently from the configuration in FIG. 3a, but the results obtained are basically the same as those shown in FIG. 3b. Therefore, the experimental results obtained with reference to the configuration of FIG. 3a and described above can apply to the configuration of FIG. 1.

Figure 4:
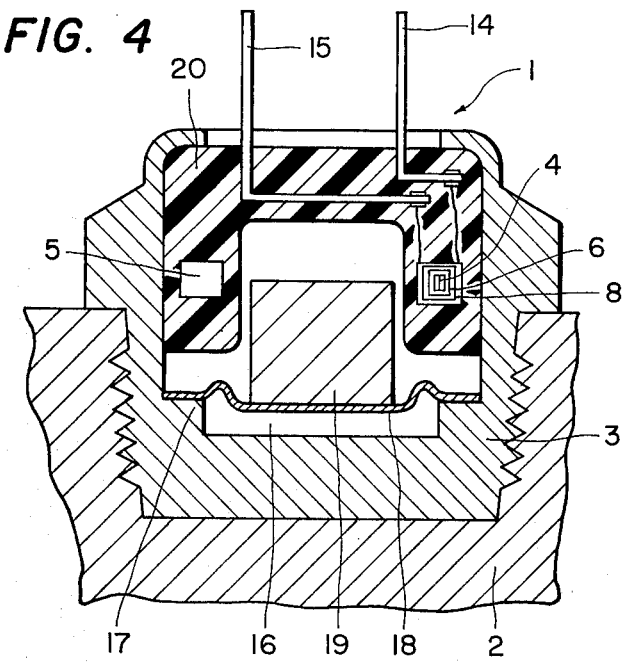
FIG. 4 is a longitudinal section of another preferred embodiment of the vibration sensor according to the present invention.

A variation of the foregoing embodiment is shown in FIG. 4 and is now described. The sensor 1 according to the embodiment in FIG. 4 differs from the other embodiment in that as shown in FIG. 4 the sensor 1 includes a holder member 20 of synthetic resin material integrally formed with the body, the holder member 20 accommodating a permanent magnet 5 and a single magnetically soft member 4 carrying a coil 8 by way of a bobbin 6, and a ferromagnetic member 19 is interposed between the permanent magnet 5 and the magnetically soft member 4 carrying the coil 8 so that the ferromagnetic member 19 can have a relative displacement in response to any vibration. In this embodiment, the permanent magnet 5 and the magnetically soft member 4 are disposed with their respective longitudinal axes extending in a longitudinal (Y-Y) direction or in a direction perpendicular to the plane of the drawing in FIG. 4, and the ferromagnetic member 19 with its longitudinal axis extending parallel with the Y-Y direction is disposed so that it can have a relative displacement caused by any vibration in the X-X direction transversing the Y-Y direction or in a vertical direction in the plane of the drawing in FIG. 4. Basically, the same members in the configuration of FIG. 4 as those in the other embodiment have been given the same reference numerals, and the description of those members is omitted.

The vibration sensor arrangement 1 according to the embodiment in FIG. 4 is also connected to the previously described electrical processing circuit 100. The

TABLE 1

| Case No. | Magnetically soft member 4 | | | | | Coil 8 | Permanent magnet 10 | | |
|---|---|---|---|---|---|---|---|---|---|
| | Material Atomic weight percent | Thickness mm | a mm | b mm | Number of sheets | Number of turns | c mm | d mm | e mm |
| 1 | Fe$_{40}$Ni$_{38}$Mo$_{14}$B$_6$ Amorphous | 0.058 | 30 | 1.8 | 5 | 1000 | 30 | 5 | 5 |
| 2 | Fe$_{40}$Ni$_{38}$Mo$_{14}$B$_6$ Amorphous | " | " | " | " | " | " | " | " |

Figure 5B:
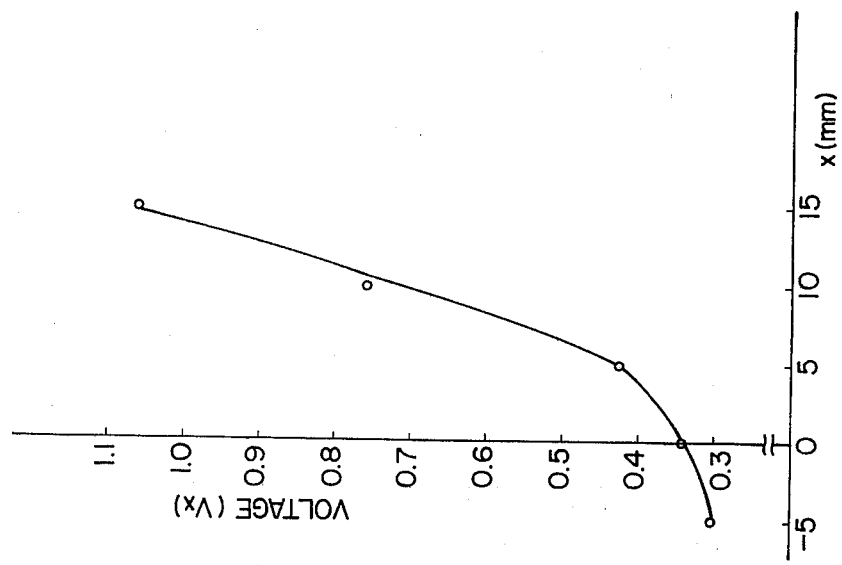
Figure 5A:
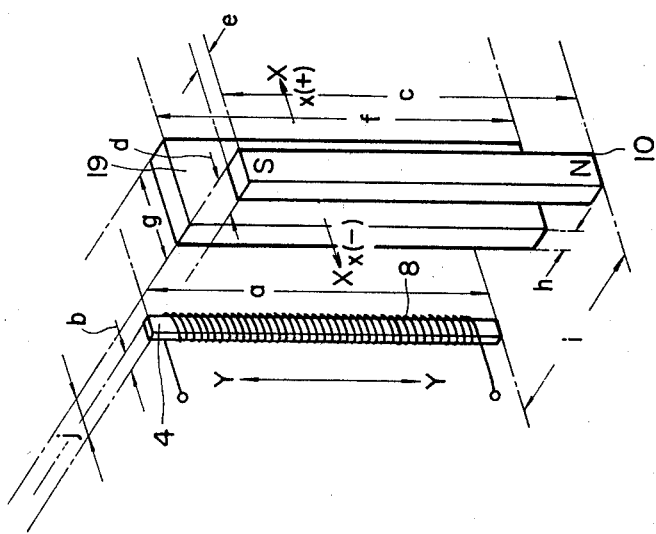
FIG. 5a is a perspective view similar to FIG. 3a, illustrating the relative positions of the magnetically soft member, permanent magnet and ferromagnetic member as configured in FIG. 4.

| Case No. | Ferromagnetic member 19 | | | | Spacing | | Measuring means and frequency of input pulse | Voltage polarity | Data |
|---|---|---|---|---|---|---|---|---|---|
| | Material Atom. weight percent | f mm | g mm | h mm | i mm | j mm | | | |
| 1 | Fe$_{40}$Ni$_{40}$P$_{14}$B$_6$ Amorphous | 25 | 10 | 2 | 30 | x | Circuit 100 5 KHz | N—N | FIG. 3 |
| 2 | Fe$_{40}$Ni$_{40}$P$_{14}$B$_6$ Amorphous | 50 | 30 | " | 15 | x | Circuit 100 5 KHz | " | FIG. 5a |

In the above table, the applied voltage polarity mode N-N indicates that a coil 8 on the magnetically soft member 4 is connected with the electrical circuit such that the coil provides a pole of the same polarity as that of the permanent magnet 10.

As it is clear from the data in FIG. 3b, a voltage Vx of very high linearity and accuracy can be obtained for the relative displacement position x of the ferromagnetic member 19 which is within the range of −5 mm to +5 mm in the X-X direction, or preferably −5 mm to −2.5 mm. Consequently, a vibration sensor can be designed and made so that a distance j is selected as small as possible and the relative displacement position is set to the above range so as to provide a voltage Vx, of electrical processing circuit 100 is responsive to the detected relative displacement positions assumed by the ferromagnetic member 19 and provides corresponding electrical signals. The occurrence will be described by referring to the experimental data presented in FIG. 5b.

In order to experimentally determine a time difference indicative voltage Vx, corresponding to any relative displaced position x assumed by the ferromagnetic member 19 in the X-X direction in relation to the magnetically soft member 4, the sensor 1, as shown in FIG. 5a, has been configured so that the magnetically soft member 4, permanent magnet 10, and ferromagnetic member 19 are disposed with their respective longitudinal axes extending in the Y-Y direction and it is assumed that when the mid-point of the longitudinal axis of the ferromagnetic member 19 is situated in the middle positions of the respective longitudinal axes of the magnetically soft member 4 and permanent magnet 10 and the distance j shown in FIG. 5a between the ferromagnetic member 19 capable of a relative displacement in the X-X direction and the magnetically soft member 4 is zero (0), the ferromagnetic member 19 is situated at origin (x=0). Case No. 2 in the noted table presents the relationships between the parameters such as shapes, configurations, dimensions and types of materials used, and the experimentally obtained results.

As is clear from the data in FIG. 5b, a voltage Vx of very high linearity and accuracy can be obtained for the relative displacement position x of the ferromagnetic member 19 which is within the range of −5 mm to +15 mm, or preferably the range of +5 mm to +15 mm in the X-X direction. It should be understood that in FIG. 4, any upward displacement of the ferromagnetic member 19 away from the origin (x=0) signifies a negative displacement while any downward displacement signifies a positive displacement.

As it has heretofore been described by reference to the various preferred embodiments and variations thereof, the vibration sensor can response to vibrations caused with the structural block such as an engine block and provide appropriate command signals which control the engine operation depending on the condition of the engine such as knocking and so forth. It should be noted that the engine block cited herein as an example may be replaced by other objects which are susceptible to vibrations.

In each of the above-described embodiments the magnetically soft member is formed of several laminated sheets of amorphous magnetic material which provide high permeability, high resilience and high resistance to deformation. In accordance with the present invention, however, other magnetically soft materials such as Mu metal ($Ni_{80}$-$Fe_{16}$-$Mo_4$ alloy), supermalloy ($Ni_{80}$-$Fe_{20}$ alloy) and similar alloys may be used instead of the described materials. Those magnetically soft materials cited, including the amorphous magnetic material, are limited to the types and atomic weight percents thereof disclosed herein, and it should be understood that appropriate changes or modifications may be possible depending on the applications or uses. In applications which require high vibration resistance and high deformation resistance, the amorphous magnetic material should preferably be used.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vibration sensor arrangement which comprises:
    a body means mounted on a structural block susceptible to vibrations and adapted to vibrate with the structural block;
    resilient means disposed within said body;
    a ferromagnetic material member mounted on said resilient means and adapted to have a relative displacement caused by the vibrations of said body;
    permanent magnet means and at least one magnetically soft core means disposed adjacent to the range of the relative displacement of said ferromagnetic material member;
    an electrical coil wound around said magnetically soft core means; and
    detection means for applying a predetermined pulse voltage to said electrical coil to saturate said core means and for detecting changes in the external magnetic field strength provided by said permanent magnet means acting on said magnetically soft core means according to changes in the relative position of said ferromagnetic material member, comprising means for producing an output signal indicative of said vibrations based on the time between application of said pulse voltage and saturation of said core means.

2. A vibration sensor arrangement as in claim 1, wherein said resilient means is a flat leaf spring.

3. A vibration sensor arrangement as in claim 1, wherein said magnetically soft core means is formed on an amorphous magnetic material.

4. A vibration sensor arrangement as in claim 1, wherein said ferromagnetic material member is formed of an amorphous magnetic material.

5. A vibration sensor arrangement according to claim 1, further comprising:
    said permanent magnet means and said magnetically soft core means with said wound coil disposed in parallel with and in spaced relation with each other;
    said ferromagnetic material member being interposed between said magnetically soft core means with said wound coil and said permanent magnet means and movable in the space therebetween in response to the vibrations of said body; and
    each of said permanent magnet, magnetically soft member with said would coil, and ferromagnetic member having a respective longitudinal axis positioned in parallel with one another.

* * * * *